June 27, 1967 R. W. STUART, JR., ET AL 3,328,564
FREQUENCY MEASUREMENT SYSTEM WITH COUNTING AND STORAGE
Original Filed Feb. 19, 1960 2 Sheets-Sheet 1

INVENTORS
ROBERT WILLIAM STUART, JR.
RICHARD W. FRANK

BY *Rines and Rines*

ATTORNEYS

June 27, 1967    R. W. STUART, JR., ET AL    3,328,564
FREQUENCY MEASUREMENT SYSTEM WITH COUNTING AND STORAGE
Original Filed Feb. 19, 1960    2 Sheets-Sheet 2

INVENTORS
ROBERT WILLIAM STUART, JR.
RICHARD W. FRANK

BY Rines and Rines

ATTORNEYS 3,328,564
FREQUENCY MEASUREMENT SYSTEM WITH COUNTING AND STORAGE
Robert William Stuart, Jr., Bedford, and Richard W. Frank, Concord, Mass., assignors to General Radio Company, West Concord, Mass., a corporation of Massachusetts
Continuation of application Ser. No. 9,989, Feb. 19, 1960. This application Oct. 13, 1966, Ser. No. 586,406
8 Claims. (Cl. 235—92)

This application is a continuation of Ser. No. 9,989, filed Feb. 19, 1960, for Counting and Storage System.

The present invention relates to computing systems, and more particularly, to counting, storing and display circuits employed in the measurement of electrical frequency.

In conventional electronic counting and display systems, an electrical-impulse counter as, for example, of the decade type, will register a number of successive counts over a period of time; and then, over a subsequent similar period of time, will store the count for display purposes. A time-sharing use of the counter circuit as an accumulator and then as a storage device for display is thus involved, the display occurring only at periodic intervals and not continually. Continual displays have been produced, however, with, for example, electron-beam type counters and relay storage matrices and the like, but the techniques therein-involved are relatively complex and costly.

An object of the present invention, accordingly, is to provide a new and improved counting and storage system of the character described that will permit of continual display or other indication of electrical frequency.

A further object is to provide a novel system whereby the operator may optionally operate the system to produce time-shared counting, storage and display, as above described, or continual counting and continual display at will.

An additional object is to attain the above results with the aid of electrical coupling circuits that are not only reliable and fool-proof, but are simple, space-saving and inexpensive, both as to initial cost and maintenance.

Other and further objects will be explained hereinafter and will be more particularly pointed out in the appended claims.

The invention will now be described in connection with the accompanying drawing, FIGURE 1 of which is a block diagram illustrating a counter system constructed in accordance with the invention;

Figure 1:
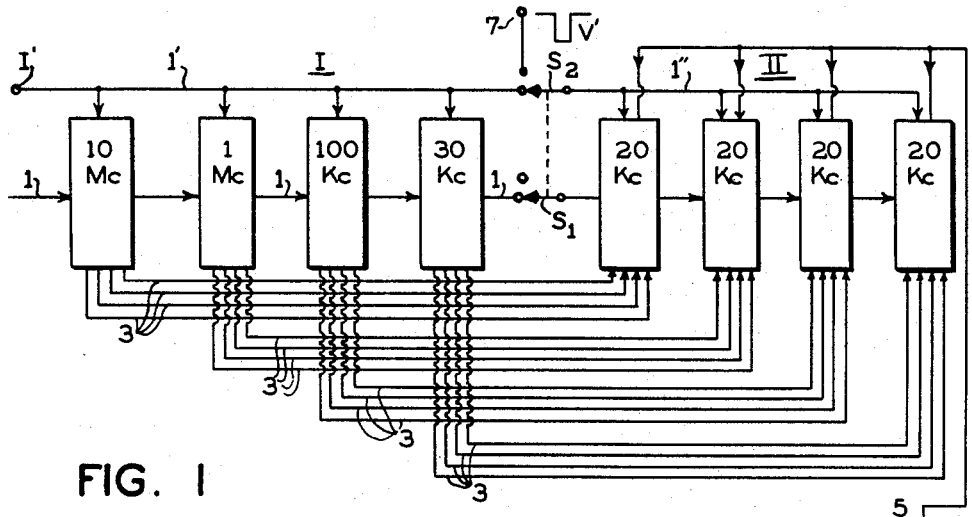

Referring to FIGURE 1, a conventional eight-digit or eight-place decade counter is shown, for illustrative purposes, having switching decades, labelled, for example, 10 mc. and 1 mc., meaning ten megacycles and one megacycle frequency of operation, respectively and 100 kc., 30 kc. and 20 kc., meaning one hundred, thirty and twenty kilocycles, respectively. When serially operated, as schematically indicated by the successive horizontal connections 1 and 1' interconnecting the decades, each decade will register electrical impulses over a predetermined counting interval and then pause to store and display that fact during a display interval. Since this operation is so well known, it will not be further discussed herein in order not to detract from the features of novelty of the present invention. For the further details of this operation, reference may be had, for example, to "Electronic Measurements" 2nd Edition, Terman and Pettit, McGraw Hill, 1952, pages 220 to 222; and Hewlett-Packard Journal, vol. 2, No. 5, January 1951.

As before stated, it is desirable, with this type of counter, to present, at times, a continual display of the changing count rather than the part-time display periodically presented after each switching decade has counted over a predetermined counting interval. This end is achieved, in accordance with the present invention, by converting the serial operation of the counters to a type of parallel operation in which the chain of decades is divided into two parallel groups, such as the groups I and II of FIGURE 1. The decades of group I are then operated exclusively as counting devices, without stopping to store and display; and the decades of the other group II are continually operated exclusively for storing and display functions, under the control of the counting decades of the first group. Thus, if switches $S_1$ and $S_2$ in FIGURE 1 are moved to the upper positions, the serial decade-counting operation connections 1 and 1' are interrupted.

The decades I, as later explained, upon application of appropriate voltage pulses, are temporarily stopped in their counting function while the corresponding decades II have transferred to them for display the counts of the respective counters of the decades I. The decade units II then function exclusively as storage and display circuits, while the decade units I alone perform counting functions.

Four of the digits or places, corresponding, in the illustrative example of FIGURE 1, to the counts of the 10 mc., 1 mc., 100 kc. and 30 kc. decades of group I, are thus continually stored and displayed or otherwise indicated by the corresponding 20 kc. switching decades of group II. This operation might, for example, be used to read the frequency of electrical oscillations of an unknown frequency. If the operator desires to follow continually the changes in, say, the last four digits or places, the switches $S_1$ and $S_2$ may be operated and the operating voltage pulses may be applied, as later explained, so that the right-hand group II of decades will continually display the four digits transferred from the continually counting decades of group I. By changing the counting interval, of course, any desired four digits may be thus displayed or otherwise indicated.

Figure 2:
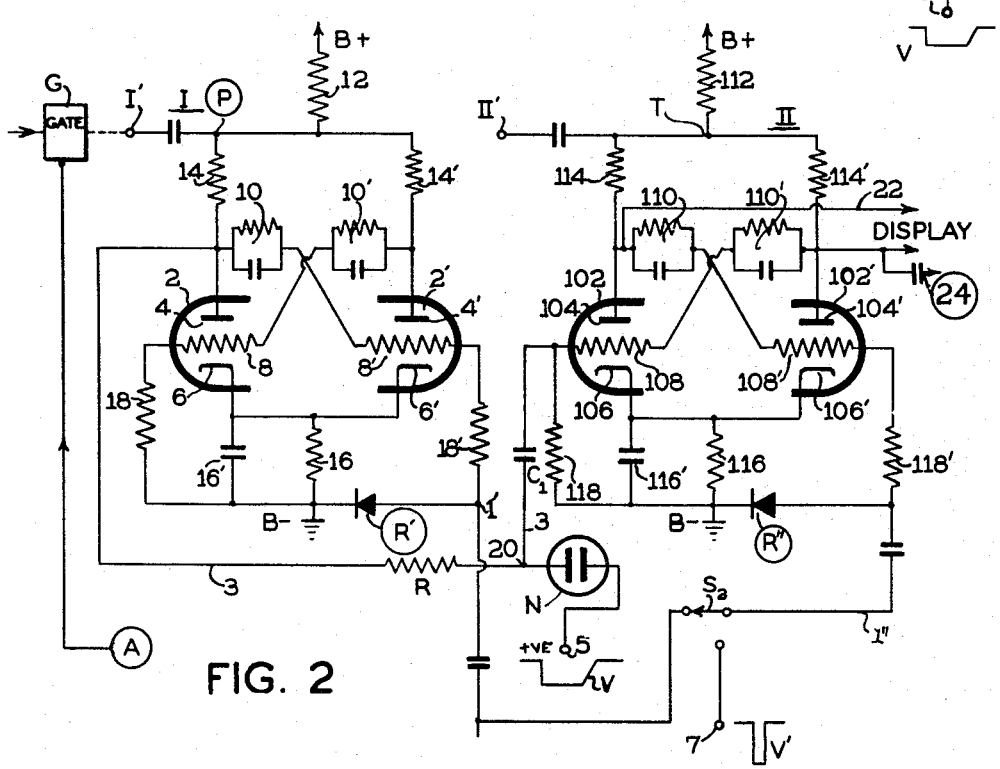
FIGURE 2 is a partial schematic diagram of a preferred circuit for use in the system of FIGURE 1.

Preferred circuit details for effecting this result are shown in FIGURE 2; illustrated, for purposes of simplicity, as applied to a typical multivibrator switching circuit or "flip-flop" of one decade of group I, and a typical corresponding multivibrator switching circuit of one decade of group II. It is, of course, to be understood, that the other decade circuits will be similarly interconnected with four connections 3 per decade. The left-hand multivibrator circuit of the group I comprises a pair of conventional electron tube relays of, for example, the triode type 2, 2', though other types of electron tubes, transistors, and other relay or switching devices may, of course, also be employed, as is well known. The switching tubes 2, 2' are provided with respective anodes 4, 4', cathodes 6, 6' and control electrodes 8, 8'. The anode or output circuit of the tube 2 is connected to the control-electrode or input circuit of the tube 2' by the resistance-capacitance coupling network 10. The control-electrode 8 of the tube 2 is coupled by a similar network 10' to the anode 4' of the tube 2'. As is conventional, the anodes 4 and 4' are supplied through a common impedance 12 and respective load resistors 14 and 14', connected thereto at a common point P, with plate potential from the positive terminal B+ of the plate-supply voltage source B+, B—. The negative terminal B— may be grounded, as shown, and may connect through a common cathode resistor 16, by-passed at 16', to the cathodes 6 and 6', of the tubes 2, 2'. Grid resistors 18 and 18' are also shown connected between the respective control electrodes 8 and 8' and the said B— terminal. The voltage impulses for effecting the counting operation of the tubes 2 and 2' are applied initially from a conventional gate circuit G, to the terminal I' and thence to the common point P.

The right-hand multivibrator circuit is illustrated as of identical configuration, so that it need not be described other than to state that the parts thereof have been given the same reference numerals as the corresponding parts of the circuit 2, 2', though augmented by 100. Thus, for example, the two electron tubes of the right-hand multivibrator are numbered 102 and 102'.

In normal operation, with switch $S_1$ of FIGURE 1 closed, the multivibrator circuit 2, 2' and the multivibrator circuit 102, 102', as well as all the other counting circuits, are operating as cascade counting devices in conventional fashion. Thus, an impulse at terminal I', FIGURE 2, operates the circuit 2, 2', and an impulse at terminal II' operates the circuit 102, 102'.

When it is desired to cause the multivibrator circuit 2, 2' to count exclusively and the multivibrator circuit 102, 102' to store exclusively, the operator opens the switch $S_1$ of FIGURE 1, breaking the chain 1, and opens the switch $S_2$ of FIGURES 1 and 2.

Figure 3:
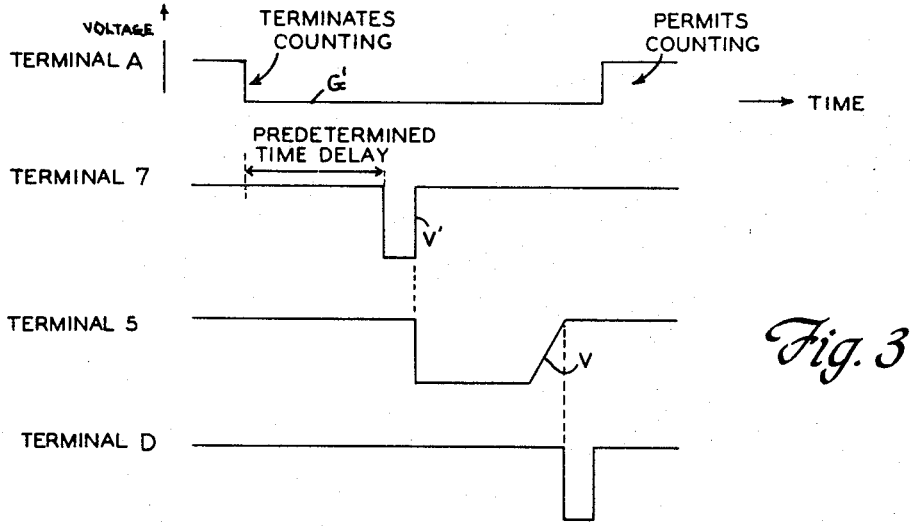
FIGURE 3 is a wave-form diagram illustrating the timing of the various voltages applied to the circuit of FIGURE 2.

A voltage pulse G', shown at the top of FIGURE 3, is applied to the gate G from the terminal A in order to terminate the counting operation of 2, 2' and the other counting decades of group I for the brief interval of the time duration of the pulse. After a predetermined time-delay interval later, say about 250 micro-seconds, more or less, introduced to allow for the settling down of the transfer connections 3, etc., a negative re-set pulse V' of about 30 micro-seconds, more or less, is applied to terminal 7, and, through the switch $S_2$, by conductor 1'' to the lower terminal of resistor 118' and the right-hand terminal of rectifier R''. The rectifier R'' normally presents a low-impedance to ground; but when the pulse V' is applied, it causes the lower terminal of 118' to drop in potential below the ground potential B—. The control grid electrode 108' of the tube 102', is thus affected, re-setting the state of the stage 102, 102' which is to function thereafter solely as a storage and display indicator of the count periodically registered by the counter 2, 2'. Following the trailing or rising edge of the re-set pulse V', a bias pulse V is thereupon supplied to the terminal 5, changing the positive bias $+ve$ normally applied to the right-hand electrode of the later-described gaseous-discharge tube N. This pulse V may be termed a transfer-command pulse, since, as hereinafter explained, it serves to transfer to the storage-and-display circuit 102, 102' the state of the counter stage 2, 2'. At the termination of the rising right-hand edge of the pulse V, (where the pulse V may have a total pulse width of, for example, about 500 microseconds) a further negative pulse, shown at the bottom of FIGURE 3 is applied to the terminal D, and thence by conductor 1' to the lower terminal of resistor 18' and the right-hand terminal of rectifier R', similar to before-described rectifier R''. Since resistor 18' connects to the grid 8' of tube 2', the counting stage 2, 2' is thereby reset, so that upon the termination (or rise) of the pulse at terminal A (the uppermost waveform of FIGURE 3), the stage 2, 2' is ready to assume its counting function, again. Periodically applied pulse sequences, as in FIGURE 3, will result in periodic counting by 2, 2' and storage display of the count by operation of 102, 102'.

The ultimate display operated by the stage 102, 102' may assume the form of conventional gas-tube indicators, or other visual devices, labelled "Display". The term "indicate," moreover, as used in the specification and claims herein, is intended generically to embrace any kind of display, recording or production of an effect indicative of the state of storage operation of the circuit.

Figure 2A:
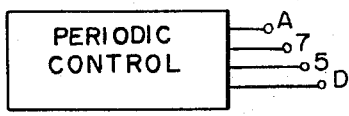
FIGURE 2A is a block diagram of a periodic control for producing sequential control voltages for application to the circuit of FIGURE 2.

The timed voltage pulses of FIGURE 3 may be produced in any well-known manner, not illustrated in order not to confuse the disclosure with prior-art circuits. The pulse in the uppermost waveform G' of FIGURE 3 may be produced by a pulse generator such as, for example, a mono-stable multivibrator of conventional configuration. Reference may be made, for example, to "Pulse Techniques," Maskowitz and Racker, Prentice Hall, 1951, pages 191–206. The delayed pulse V' may be produced from the multibrator pulse by any desired further time-delay multivibrator, as explained in the "Pulse Techniques" text; or, as another example, by a pulse-delay circuit of the type described on pages 2–98 of "Principles of Radar," by the Staff of the Radar School of the Massachusetts Institute of Technology, McGraw-Hill, 1946. The pulse V may be produced from the delay pulse V' by, for example, triggering a further multivibrator, as above discussed; and the pulse at terminal D may be obtained from still a further similar time-delay multivibrator, as explained in the above texts. Other equally conventional circuits, well known to those skilled in this art, may obviously also be employed. The block diagram of FIGURE 2A is intended to embrace all such periodic controls for producing the voltage pulses of FIGURE 3.

It remains to explain, however, how, once the counting circuit 2, 2' is rendered inoperative by the pulse at terminal A, and the reset pulse V' has operated upon the stage 102, 102', the transfer-command pulse V sets the stage 102, 102' at the state of the counter stage 2, 2'.

The coupling circuit 3 comprises an isolating impedance, such as a high-value resistor R, a non-linear device N, preferably of the voltage-threshold-operated type, such as a two-electrode gaseous-discharge tube of the cold-electrode neon type, a source of bias potential represented by the terminal 5, labelled $+ve$, and a coupling capacitance $C_1$. Other types of non-linear devices may also be employed, though the neon tube is preferred because of its reliability, life, low cost and desirable characteristics, later explained. The resistor R and the tube N are shown connected in series between the output, namely, the anode 4 of the switching electron tube 2, and the bias-voltage terminal 5. The junction 20 between the resistor R and the left-hand electrode of the tube N is connected through the coupling capacitance $C_1$ to the input, namely, to the control electrode 108, of the tube 102.

Assume, for example, that in one of the switching or counting states of the multivibrator 2, 2', the tube 2 is cut off and the tube 2' is in conduction. The voltage at the anode 4 may be, say, 140 volts, and the voltage at the anode 4' may be 60 volts. Since the anode 4 is connected through the isolating resistor R to the left-hand electrode of the device N, the junction 20 will also be maintained, at 140-volts potential. By adjusting the bias voltage at terminal 5 to approximately 100 volts, the difference in potential across the device N will only be 40 volts—a value far below the threshold ionizing voltage necessary to permit the neon gas to ionize or conduct. The coupling circuit 3 is thus ineffective. When the bias voltage at terminal 5 is changed, however, say lowered to 20 volts, as by the direct-current voltage impulse V, the threshold ionizing potential difference is applied and the neon device N will conduct, maintaining about a sixty-volt drop thereacross. The coupling circuit 3 thus can couple a sufficiently high negative voltage to the control-electrode 108 of the multivibrator tube 102 so as to set the tube 102 to cut off. The tube 102 is now in the same state as the tube 2 and the stage 102, 102' can operate to indicate the count of 2, 2'.

The above, however, is a single case, based upon an assumed state. In general, the voltage levels in the above example could be of four types at the time the re-set pulse V' is applied at terminal 7:

| Plate 4 of Tube 2 (volts) | Plate 104 of Tube 102 (volts) |
|---|---|
| 140 | 140 |
| 140 | 60 |
| 60 | 140 |
| 60 | 60 |

When negative pulse V' is applied, tube 102' cuts off and its plate 102 drops to, say, the 60-volt level. Two possible states of 2, 2' are then possible:

| | Plate 4 of Tube 2 (volts) | Plate 104 of Tube 102 (volts) |
|---|---|---|
| 1 | 140 | 60 |
| 2 | 60 | 60 |

The transfer-command pulse V now drops the voltage at the right hand electrode of the tube N from, say 100 volts down to 20 volts. If tube 2 is non-conducting, its plate 4 will be at the illustrative 140 volts; and, by virtue of the connection of the plate 4 through R to the left-hand electrode of the tube N, a sufficient drop across N occurs to ionize the same and to drop the control electrode 108 to cut-off. The stage 102, 102' thus assumes or has transferred to it the same state as the counter stage 2, 2'.

Similarly, if the tube 2 had been conducting, its plate 4 would have been at the 60-volt level, in the above illustration, and the tube N would not ionize. The plate 104 of the tube 102 would thus also have remained at 60 volts (conducting), so that, again the stage 102, 102' is in the same state as the counter stage 2, 2'.

The sloping characteristic of the right-hand edge of the pulse V is useful to prevent too-much build-up of voltage at 20 before the tube N has had time completely to de-ionize.

By connecting output "DISPLAY" conductors 22 to the anodes 104 and 104', storage information as to the electrical impulse count data transferred through the coupling circuit 3 is continually available for operating any desired indication system. A continual display or other indication is thus provided of the count periodically achieved by the corresponding counter stage.

During the time that the stage 2, 2' is counting, and the anode 4 is rising and falling, there is never sufficient voltage developed across N to affect the continual storage and display operation of the stage 102, 102'. Only at the times of application of the pulse G' to terminal A, does the coupling circuit embodying the neon tube N become operative to permit the stage 2, 2' to control the stage 102, 102'. Permanent circuit connections 3 between the stages 2, 2' and 102, 102' are thus most conveniently possible at all times, eliminating any necessity for complex switching of connections.

Figure 4:
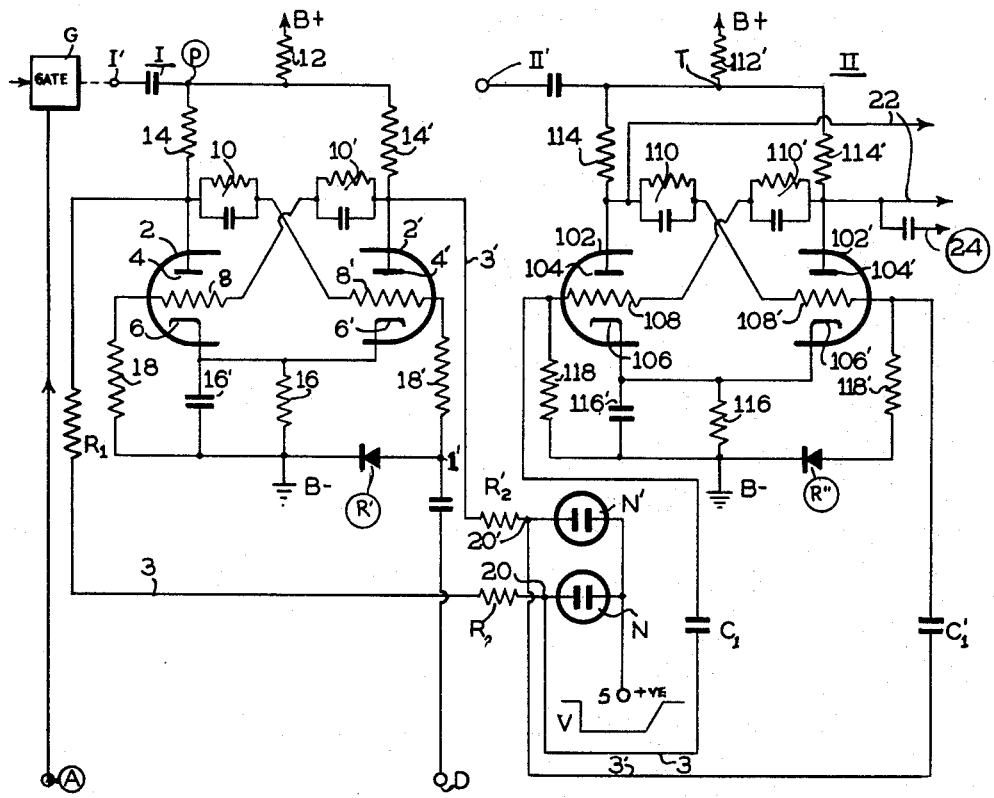
FIGURE 4 is a partial circuit diagram of a modification.

An alternative arrangement is shown in FIGURE 4 which eliminates the necessity of the re-set pulse V'. Two similar coupling circuits 3 and 3' are there provided, each having respective isolating-impedance $R_2$ and $R_2'$, neon tubes or similar devices N and N', and coupling capacitors $C_1$ and $C_1'$. In this case, the coupling circuit 3' between the output (namely, the anode 4' of the tube 2') and the input (namely, the control electrode 108' of the tube 102') eliminates the necessity for the re-set voltage V' of FIGURE 2. The sequence of operation for all possible circumstances, may be summarized as follows:

| Plate 4 of Tube 2 (volts) | Plate 104 of Tube 102 (volts) (initially) | Neon condition | Grid that is cut-off | Plate 104 of tube 102 (Subsequently) |
|---|---|---|---|---|
| 140 | 140 | N fires | 108 | 140 |
| 140 | 60 | N fires | 108 | 140 |
| 60 | 140 | N' fires | 108' | 60 |
| 60 | 60 | N' fires | 108' | 60 |

Note that the first and last columns show that the stage 102, 102' is set in the same state as the counter stage 2, 2'.

With the systems of FIGURES 2 and 4, moreover, it is preferable to open-circuit or otherwise disable successive coupling circuits, such as at the conductor 24, to insure against false operation of the system due to variable ionization delays in the tube N.

It is, of course, to be understood that, from its broadest concepts, the invention is not restricted, however, to the preferred multivibrator type of switching devices, but is operable with any other type of switching device suited for the purpose. Further modifications will occur to those skilled in the art and all such are considered to fall within the spirit and scope of the invention as defined in the appended claims.

What is claimed is:

1. A system for measuring the frequency of electrical impulses by counting the impulses during successive predetermined counting intervals and for providing a continual display throughout each interval of a multiple-place digital count attained at the end of the preceding interval, the system comprising in combination, multiple-place digital impulse-counting means normally operative to count electrical impulses continually, multiple-place digital count storing and displaying means normally operative to store and display a multiple-place digital count continually while said counting means is counting, count transfer means adapted, when operative, to transfer a count from said counting means to said storing and displaying means, said counting means comprising a plurality of serially connected flip-flop counting circuits, said storing and displaying means comprising a corresponding plurality of storing and displaying circuits each of which is independent of and disconnected from the others of said storing and displaying circuits, said transfer means comprising a corresponding plurality of coupling circuits connecting corresponding flip-flop counting circuits to corresponding storing and displaying circuits, means for applying electrical impulses of unknown frequency to said counting means, and control means independent of said electrical impulses for periodically rendering said flip-flop circuits inoperative to count said impulses only during transfer intervals of predetermined brief duration between said counting intervals and for rendering all said coupling circuits operative to transfer the count to said storing and displaying circuits only during said transfer intervals, whereby said impulses are counted continually during said counting intervals and the multiple-place digital count attained at the conclusion of each counting interval is continually displayed throughout the succeeding counting interval.

2. The system of claim 1, said control means comprising means for periodically producing a cut-off pulse of predetermined brief duration to prevent counting by said counting circuits during said transfer intervals, means for producing during said cut-off pulse, first a transfer pulse to render said coupling circuits operative and then a reset pulse to condition said counting circuits for the resumption of counting at the end of said cut-off pulse.

3. The system of claim 2, said control means further comprising means for producing during said cut-off pulse just prior to said transfer pulse a further reset pulse for setting said storing and displaying circuits in predetermined state.

4. The system of claim 2, further comprising additional coupling circuits interconnecting said flip-flop counting circuits and said storing and displaying circuits, said control means comprising means for periodically rendering said further coupling circuits operative, during said cut-off pulse and only prior to said transfer pulse, for re-setting said storing and displaying circuits in a predetermined state.

5. The system of claim 1, said coupling circuits comprising diodes.

6. The system of claim 1, said coupling circuits comprising gaseous discharge devices.

7. The system of claim 1, said counting circuits being connected to produce a decimal counting sequence.

8. The system of claim 1, further comprising selective means for connecting said storing and displaying circuits as a series counting chain in series with said counting circuits.

References Cited

UNITED STATES PATENTS

| | | | |
|---|---|---|---|
| 2,616,965 | 11/1952 | Holppner | 235—173 |
| 2,745,006 | 5/1956 | Chu | 328—50 |
| 2,844,310 | 7/1958 | Cartwright | 235—173 |
| 2,849,704 | 8/1958 | Neff | 340—174 |

MAYNARD R. WILBUR, *Primary Examiner.*

G. MAIER, *Assistant Examiner.*